Oct. 18, 1932.   H. M. CRANE   1,883,588
FLUID BRAKE
Filed May 27, 1927
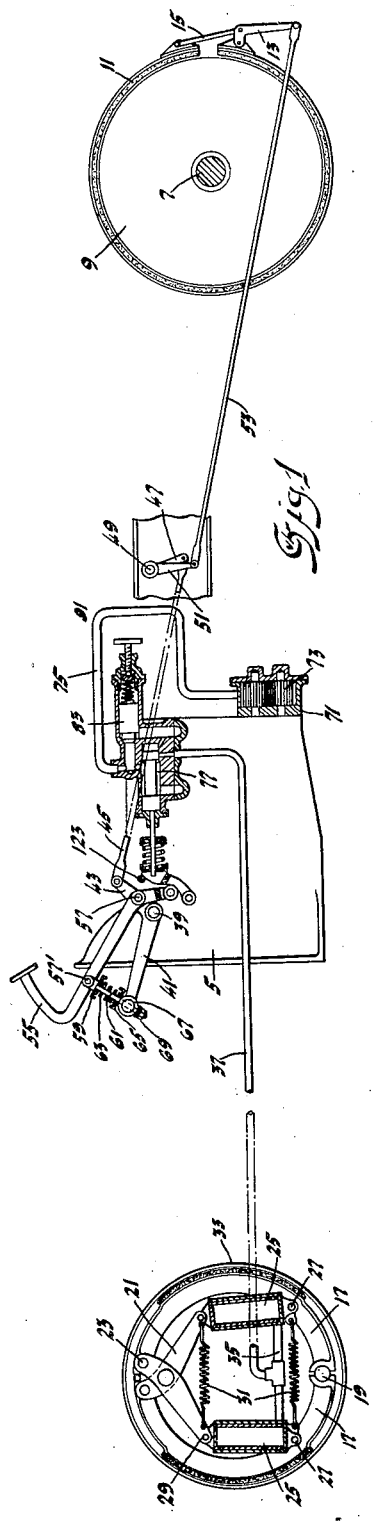
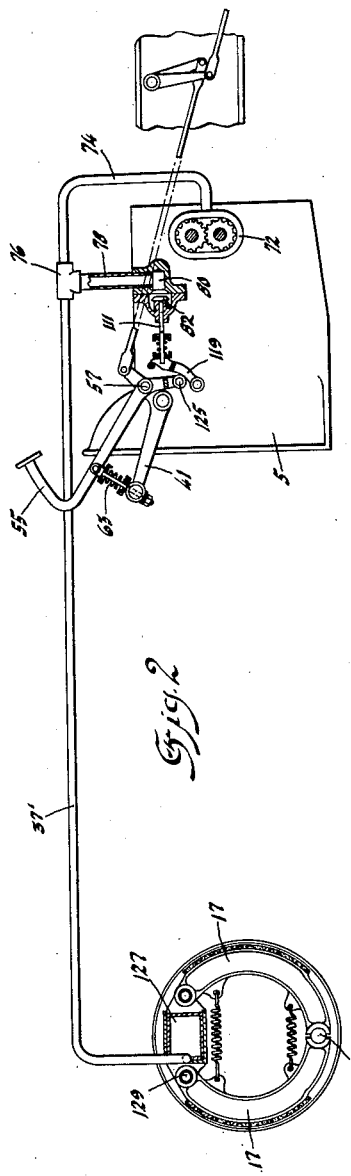
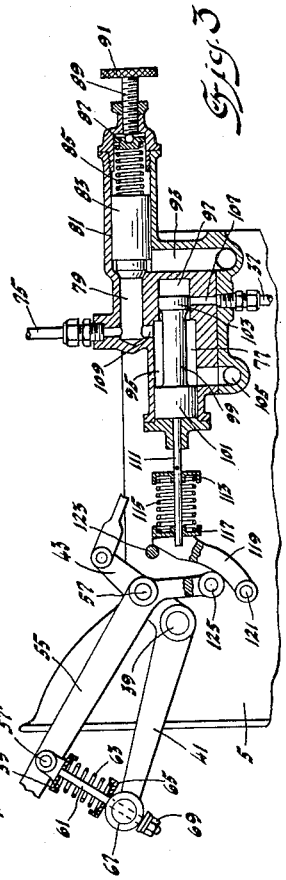
Inventor
Henry M. Crane
By Blackmore, Spencer & Fish
Attorneys Patented Oct. 18, 1932

1,883,588

UNITED STATES PATENT OFFICE

HENRY M. CRANE, OF NEW YORK, N. Y., ASSIGNOR TO GENERAL MOTORS CORPORATION, OF DETROIT, MICHIGAN, A CORPORATION OF DELAWARE

FLUID BRAKE

Application filed May 27, 1927. Serial No. 194,657.

This invention relates to brakes. The brake system has been designed for use on vehicles, more particularly on motor vehicles.

An object of the invention is to combine a mechanical brake with a fluid and preferably a hydraulic brake. As a further object two such brakes are operated by a single manually operable member. As another object the invention makes use of a pump to normally circulate oil through a closed circuit, but which oil flow may be used to supplement the manual force in applying the brake. As a further object the invention makes use of an operating pedal which is given a bodily movement to apply one brake and a pivotal movement to apply the other brake. Other objects and advantages will be apparent from a reading of the following specification and an examination of the accompanying drawing.

In the drawing,

Figure 1 is a diagrammatic view of a braking system embodying my invention, parts being shown in section.

Figure 2 is a similar view of the modified form.

Figure 3 is a view in elevation, partly in section, of a portion of the system shown in Figure 1.

Referring first to Figure 1, numeral 5 is used to represent the conventional transmission housing. The rear axle is shown at 7 and 9 represents a brake drum carried by the rear wheel, not shown. Surrounding the brake drum 9 is a band 11. A lever 13 and a link 15 are operatively connected to the two ends of the band in such a way that the rotary movement of the lever 13 will compress the band upon the drum. At the front end of the vehicle I have shown an internal shoe brake. Two shoes 17 are shown anchored at 19. At their adjacent ends these shoes are pivoted to cross levers 21 by means of pivots 23. Expansible chambers 25, composed of telescopic cylinders, are pivoted to the brake shoes at 27. The other members of the expansible chambers 25 are pivoted to the long arm of the levers 21 at 29. Suitably positioned return springs 31 are used to withdraw the brake shoes from the drum 33 carried by the front wheel. Connecting the two expansible chambers 25 is a pipe 35. Joining the pipe by means of a T is a conduit 37.

Pivoted at a convenient point 39 is bell crank lever 41, the short arm 43 of which lever is connected by a link 45 to an arm 47 of a rock shaft 49. Rock shaft 49 has other arms 51, each of said arms 51 being connected by a link 53 to one of the levers 13 of the rear brakes. It will thus be understood that when the lever 41 rocks about its pivot 39 the rear brakes are applied through the linkage 45 and 53. A pedal 55 is pivoted at 57 to the short arm 43 of lever 41. Pivoted to the pedal at 57' is a spring abutment 59 and extending therefrom is a rod 61 surrounded by a spring 63. A second spring abutment 65 is slidable on the rod and engages the end of lever 41. The rod 61 extends through a pin 67 rotatably mounted in an eye on the end of lever 41 and on the extreme end of rod 61 are nuts 69. The spring 63 is a comparatively rigid spring and offers more resistance to the depression of the pedal than the initial resistance offers by the application of the rear brake band 11 to its drum 9. Therefore, when the pedal is first depressed there is no relative movement between pedal 55 and the lever 41 but the pedal 55 and the lever 41 move as a unit about the pivot 39 and draw the band 11 on the drum 9 of the rear wheel, thus securing an initial mechanical brake application.

It is the purpose of the invention to supplement this initial mechanical brake application by the use of a hydraulic brake upon the front wheels. For that purpose the following construction is used. Formed integrally with or attached to the transmission housing is a gear pump 71 composed of cooperating gear members 73. This pump receives oil from the transmission housing and then delivers the same through a conduit 75 to a valve chamber 77. This valve chamber is illustrated on an enlarged scale in Figure 3. The delivery conduit 75 enters a horizontal passage 79. This passage is enlarged at its outer end as at 81 and in the enlarged end is movably mounted a valve 83 which seats on the shoulder between the portions 79 and 81. This valve 83 is engaged by a spring 85, the outer abutment for which 87 is adjustable by means of a screw threaded member 89 manually operated as shown by the head 91. The passage 81 communicates with a transverse passage 93 which leads back into the transmission housing. When the pressure from the pump exceeds a predetermined amount the oil is forced from passage 79 through 81, the valve 83 being pressed back against spring 85, and into passage 93 and back to the transmission housing. A second passage preferably parallel to passage 79 is shown at 95. This passage has a portion of reduced diameter 97. A valve member is movable within the passages 95 and 97. It has a reduced intermediate portion 99, an enlarged end 101 and a smaller end 103. An outlet 105 communicates with passage 95 and with the transmission housing. An outlet 107 affords communication with passage 97 and the conduit 37 leading to the front brakes. It will be observed that the oil discharged from the pump and passing through conduit 75 enters passage 95 through an aperture 109. Within passage 95 this fluid exerts its pressure both upon head 103 and upon the head 101. Inasmuch, however, as the head 101 is of greater diameter than the head 103 the fluid tends to press the combined valve outwardly to the position illustrated in Figure 3. In this position it will be observed that the passage 105 returns the oil to the transmission housing and that the passage 107 is closed by the valve head 103. The valve member 99 has a stem 111 extending outwardly rigidly secured to which is a spring abutment 113. A spring 115 engages this fixed abutment and a sliding abutment 117. The sliding abutment is engaged by a lever 119 pivoted at 121 preferably to the wall of the transmission housing. A stop 123 is positioned to be engaged by lever 119 when the fluid pressure within chamber 95 forces the valve and its rod 111 to the outermost position illustrated.

It has been explained that upon the initial pressure pedal 55 swings together with lever 41 about pivot 39. In so swinging the inner end of the pedal 125 turns about pivot 39 and does not move lever 119. After the brake band 11 has been sufficiently drawn around the drum 9 to offer more resistance than the compression of spring 63 a further movement of the pedal compresses spring 63 and the pedal turns about its pivot 57. Such a movement of the pedal causes the end 125 to exert a pressure upon lever 119. This pressure on lever 119 through the spring 115 overcomes the pressure differential upon the heads 101 and 103 and moves the valve member 99 to the right from the position illustrated in the figure. When so moved the outlet 105 is closed and outlet 107 leading to the front brake is opened whereupon the hydraulic pressure developed by the pump is applied to actuate the front brakes.

The construction thus provided ensures an effective mechanical brake upon the rear wheels which is first to be applied upon the action of the pedal. After such first application a slight further movement supplements this braking action by a supplemental hydraulic brake applied to the front wheels. In the event of failure of the hydraulic brake it will be perfectly obvious that the rear wheel brake can be applied as forcibly as desired, it being only necessary to overcome the resistance of spring 63 so that the lever 41 shall move in unison with pedal 55.

In Figure 2 a somewhat modified form is illustrated. In this form the lever 41 and the pedal 55 are as before. The spring 63 between these parts is the same as in the form already shown. Lever 119 and the end of the pedal 125 have the same relation. The rear brake is not illustrated. It is the same as before and is similarly connected to lever 41. The front brake may be the same but is shown as composed of telescopic cylinders 127 connected at 129 to the two shoes 17 pivoted together at 19. The conduit 37' leads into the telescopic cylinders and corresponds in general to the conduit 37 of the other form.

The pump which is located in any convenient way with reference to the transmission housing is designated by numeral 72 and its outlet pipe 74 is connected by a T 76 with the conduit 37'. From the T 76 a conduit 78 leads to the valve chamber 80 which, in a general way, corresponds to the valve chamber of the form previously described but is somewhat simpler. The conduit 78 discharges into the transmission housing by passing a valve 82 engaging a seat in the valve chamber 80. The valve 82 has a stem which corresponds to the stem 111 of the valve in the form first described and which is represented by the same reference character. The spring construction associated with this valve stem is precisely the same as that shown in Figure 3.

In this second form of the invention the action of the pedal 55 with relation to the rear brake is the same as before and it operates the front brake upon a further movement as in the case previously described. The pump 72 normally transmits fluid through its outlet passage 74 and through the T 76 and return pipe 78 past the valve 82 and into the transmission housing. When the pedal swings about its pivot 57 the valve is closed against its seat and the pressure built up is discharged through conduit 37' to apply the brakes on the front wheels.

I claim:

1. In brake mechanism, a plurality of brakes, a lever, one arm of said lever connected to one of said brakes, a fluid pump, means associated with said pump to operate the other brake, a second lever pivoted to said first lever, means associated with said second lever to render the pump operative upon its brake and resilient means between said levers, said resilient means holding said levers in spaced relation and for simultaneous movement until a predetermined resistance is offered by the first one of said brakes.

2. In brake mechanism, a valve housing, a valve therein, a fluid pump, a conduit from said pump to said housing, outlets from said housing, one affording a return to said pump, the other a discharge to a fluid brake, manually operable means to move said valve to open one and close the other of said outlets, a lever and connections therefrom for operating a mechanical brake, said manually operable means being pivoted to said lever, yielding means to hold said lever and manually operable means for movement as a unit until a predetermined resistance is offered by said mechanical brake, whereupon relative movement occurs between said lever and manually operable means against the resistance of said yielding means.

3. In a combined brake system, a pedal having a fixed foot pad mounted for pivotal movement and for bodily movement, a first brake, connections between said first brake and said pedal whereby it is applied upon a bodily movement of the pedal, a second brake, connections between the said second brake and said pedal whereby said second brake is applied by a pivotal movement of said pedal, said pedal movements being successive, the first being the bodily movement, adjustable resilient means to predetermine the extent of said bodily movement before the beginning of said pivotal movement.

4. In a system of brakes for vehicles, front wheel brake mechanism, rear wheel brake mechanism, a lever, a mechanical connection between said lever and the rear wheel brake mechanism, a fluid pressure mechanism for operating the front wheel brake mechanism, a pedal pivoted to said lever, means actuated by a movement of said pedal about its pivot with said lever to render active the fluid pressure mechanism, yielding means between said pedal and lever whereby the relative movement therebetween is resisted and application of the front wheel brake mechanism prevented until after a predetermined combined movement of the pedal and lever about the pivot of the latter, resulting in the application of the rear wheel brake mechanism.

In testimony whereof I affix my signature.

HENRY M. CRANE.